No. 640,110. Patented Dec. 26, 1899.
A. T. DAWSON & G. T. BUCKHAM.
WORM GEAR FOR TRAINING GUNS.
(Application filed Aug. 28, 1899.)
(No Model.)
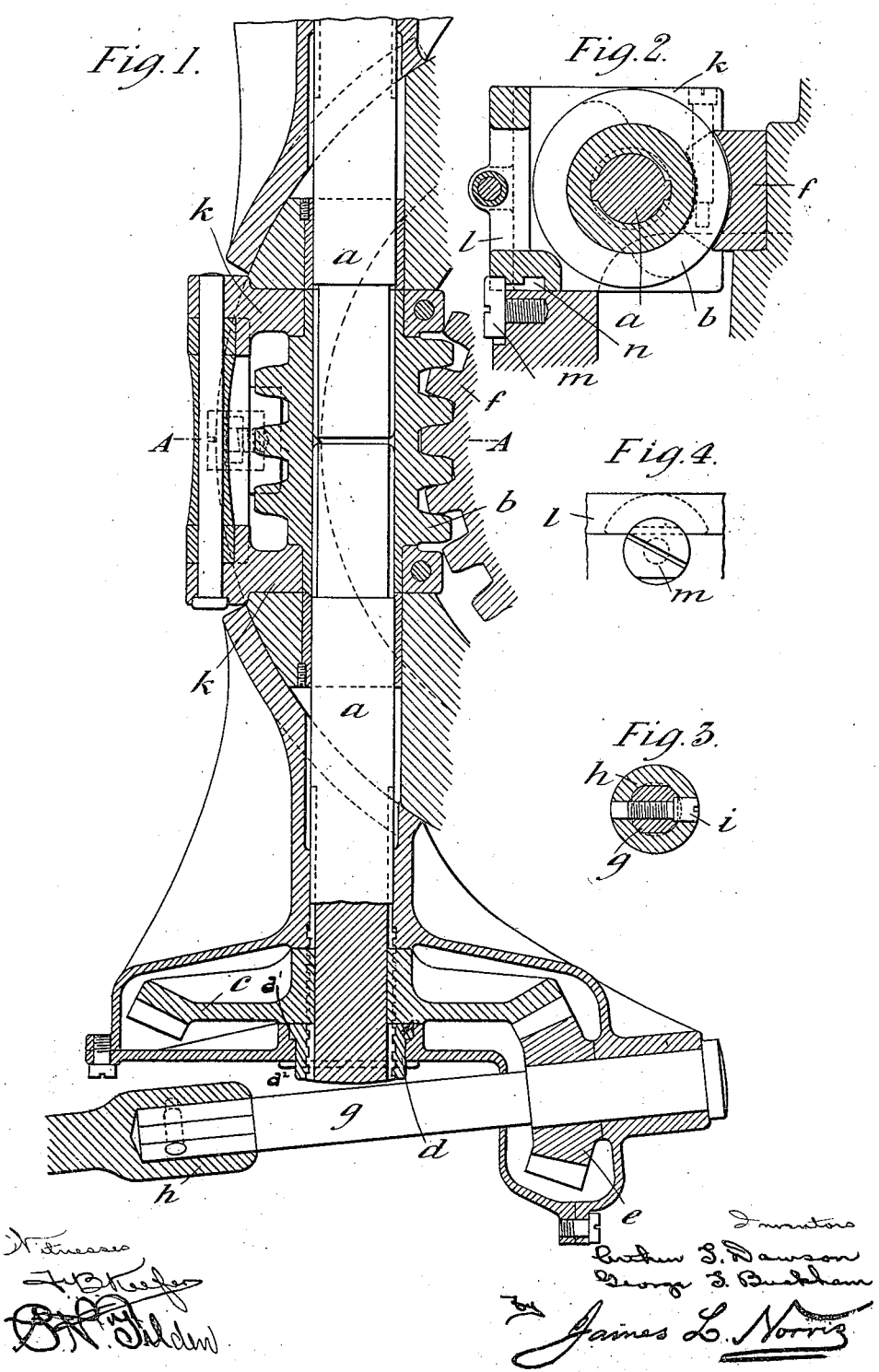

UNITED STATES PATENT OFFICE.

ARTHUR TREVOR DAWSON AND GEORGE THOMAS BUCKHAM, OF LONDON, ENGLAND, ASSIGNORS TO THE VICKERS, SONS & MAXIM, LIMITED, OF SHEFFIELD, ENGLAND.

WORM-GEAR FOR TRAINING GUNS.

SPECIFICATION forming part of Letters Patent No. 640,110, dated December 26, 1899.

Application filed August 28, 1899. Serial No. 728,790. (No model.)

*To all whom it may concern:*

Be it known that we, ARTHUR TREVOR DAWSON and GEORGE THOMAS BUCKHAM, citizens of England, residing at 28 Victoria street, Westminster, London, England, have invented a certain new and useful Improvement in Worm-Gear for Training Guns, (for which we have applied for a patent in Great Britain, dated February 6, 1899, No. 2,663,) of which the following is a specification.

The worm for training a gun is usually so arranged that if accident should happen to it the gun can no longer be trained.

This invention relates to an arrangement of the worm-gear such that in case of accident the worm can be removed, leaving the gun free to be trained by hand or otherwise. For this purpose we arrange the worm-gear as we shall describe, referring to the accompanying drawings.

Figure 1 is a sectional view of the parts comprising our invention. Fig. 2 is a section on the line A A of Fig. 1. Figs. 3 and 4 show details.

As shown in Fig. 1, which represents the worm in the middle and the hand-worked spindle in its full length on one side, but broken off on the other side, which latter is to be understood as being symmetrical with the first-named side, we make the spindle of the worm in two parts $a\ a$, the ends of which abut in the middle of the worm $b$. These ends and the bore of the worm are provided with keys and grooves, so that the spindles can slide in the worm, which must turn with them. The other ends of the spindles $a\ a$ pass through suitable bearings, as shown in Fig. 1, and through the bosses of bevel-wheels $c$, provided with keys and grooves, so that the spindles can slide through the wheels, but must turn with them. These ends are also screw-threaded and provided with nuts $d$ outside the bevel-wheels $c$. These nuts are mounted in fixed bearings $d'$, which permit them to be revolved, but do not permit them to be moved longitudinally. Usually one or other of the bevel-wheels is worked by a bevel-pinion $e$, turned by hand, and thus the worm is turned, causing the worm-wheel with which it gears to turn.

The worm $b$ gears with a worm-wheel $f$, which is fixed on the vertical central shaft of the gun-mounting or the turret or turn-table on which the gun is carried, so that as either of the part spindles $a$ or both are turned by hand the gun is trained; but should the worm-gear be injured so that it cannot work then by turning the nuts $d$ the spindles $a\ a$ are withdrawn out of the worm, leaving it free, so that it can be withdrawn from engagement with the worm-wheel, and then the gun can be raised by other means.

In order to prevent the nuts $d$ from screwing up and binding on the threaded spindle $a$ when said spindle is being operated, we provide means for locking the nut to the spindle and causing it to revolve therewith when training the gun, such means consisting of a pin $d^2$, removably inserted through a transverse opening or hole in the nut and spindle, as illustrated in the drawings. This pin $d^2$ can be readily removed when it is desired to turn the nut $d$ to withdraw the spindle $a$ out of the worm.

In the case where the spindle $g$, which is turned by hand, crosses in front of the nut $d$ the spindle is made separable, having a coupling $h$, of which Fig. 3 is a section, so that by removing a screw $i$ the spindle $g$ can be drawn back through the pinion $e$, so as to give free access to the nut $d$.

The worm $b$ has its ends formed as journals working in bearings $k$ in a frame $l$, which is fitted on the base of the mounting, so that when the spindles are withdrawn from the worm and a catch screw-nut released the frame can be drawn back, moving the worm out of gear with the worm-wheel.

The catch-screw $m$, of which Fig. 4 is a front view, has a segment cut from one side of its head, so that when it is in one position, as shown in the drawings, the full part of its head bearing against the frame $l$ prevents it from being withdrawn; but when the screw is turned half around, bringing the cut-off part to the frame $l$, then the frame can be drawn back, but not completely out of the carriage, bringing the worm $b$ out of gear with the worm-wheel $f$, and then on again turning the screw $m$ half around its head becomes engaged in a notch *n* in the side of the frame *l* and holds the frame in its withdrawn position.

Having thus described the nature of this invention and the best means we know for carrying the same into practical effect, we claim—

1. In a worm-gear for training a gun, the combination of a worm-wheel fixed on the vertical training-axis, a worm gearing with said wheel and provided with a central bore and mounted in a movable frame, an operating-spindle formed in two parts the ends of which abut in the middle of the bore of the worm, and means for withdrawing both parts of the spindle in opposite directions from the worm thereby leaving the latter free to be moved out of gear with the worm-wheel, substantially as described.

2. In a worm-gear for training a gun, the combination of a worm-wheel fixed on the training-axis, a worm gearing with said wheel and provided with an axial bore, a movable frame in which said worm is mounted, a two-part operating-spindle the adjacent ends of which are located in the bore of the worm, and means for withdrawing both parts of the spindle from the bore of the worm thereby leaving the latter free to be moved out of gear with the worm-wheel, substantially as described.

3. In a worm-gear for training a gun, the combination with a worm-wheel fixed on the training-axis, of a worm gearing with said wheel and provided with an axial bore, a horizontally-sliding frame in which said worm is mounted, a two-part operating-spindle the adjacent ends of which are seated in the axial bore of the worm, and means for withdrawing both parts of the two-part spindle from the worm whereby the said frame may be moved horizontally to take the worm out of gear with the worm-wheel, substantially as described.

4. In a worm-gear for training a gun, the combination with a worm-wheel fixed on the vertical training-axis, of a worm gearing with said wheel and provided with an axial bore, a laterally-movable frame in which said worm is mounted, an operating-spindle having a part seated in said axial bore of the worm, and means for withdrawing said spindle from the worm whereby the said frame may be moved laterally to take the worm out of gear with the wheel, substantially as described.

5. In a worm-gear for training guns, the combination with a worm-wheel fixed on the training-axis, of a worm gearing with said wheel, a laterally-movable support for said worm, and means for rotating the worm, said rotating means being detachably connected with the worm in such manner as to be disconnected therefrom to enable the worm and its support to be moved away from the wheel, substantially as described.

6. In a worm-gear for training guns, the combination with a worm-wheel fixed on the training-axis, of a worm gearing with said wheel, a laterally-movable support for said worm, means for locking said support in position, and means for rotating the worm, said rotating means being detachably connected with the worm in such manner as to be disconnected therefrom to enable the worm and its support to be moved away from the wheel, substantially as described.

7. In a worm-gear for training guns, the combination with a worm-wheel fixed on the training-axis, of a worm gearing with said wheel, a laterally-movable support for said worm, means for locking said support in position to hold the worm in mesh with the wheel, means for rotating the worm, said rotating means being detachably connected to the worm in such manner as to be disconnected therefrom to enable the worm and its support to be moved away from the wheel, and means for locking said support when so moved to hold the worm out of contact with the wheel, substantially as described.

8. In a worm-gear for training a gun, the combination with a worm-wheel fixed on the training-axis, of a worm gearing with said wheel, a laterally-movable support for said worm, means for rotating the worm, said rotating means being detachably connected to the worm in such manner as to be disconnected therefrom to enable the worm and its support to be moved away from the wheel, and means for locking said support when so moved to hold the worm out of contact with the wheel, substantially as described.

In testimony whereof we have hereunto set our hands in presence of two subscribing witnesses.

ARTHUR TREVOR DAWSON.
GEORGE THOMAS BUCKHAM.

Witnesses:
S. A. DARDIER,
HENRY KING.